United States Patent

[11] 3,614,449

[72] Inventor John H. Ward, III
  Valencia, Calif.
[21] Appl. No. 798,733
[22] Filed Feb. 12, 1969
[45] Patented Oct. 19, 1971
[73] Assignee International Telephone and Telegraph Corporation
  New York, N.Y.

[54] OPTICAL TRACKING SYSTEM UTILIZING A COAXIAL LENS SYSTEM
  6 Claims, 1 Drawing Fig.

[52] U.S. Cl............................................. 250/203,
  250/216, 350/20, 350/27, 350/172, 356/144
[51] Int. Cl....................................... G01c 1/00,
  G02b 17/00
[50] Field of Search........................................ 350/9, 20,
  27, 37, 40, 55, 172, 236, 244, 319; 356/144;
  250/83.3, 203, 216

[56] References Cited
  UNITED STATES PATENTS

| | | | |
|---|---|---|---|
| 2,504,383 | 4/1950 | Bouwers et al. | 350/27 X |
| 2,753,760 | 7/1956 | Braymer | 350/37 X |
| 2,798,961 | 7/1957 | Wormser | 350/55 X |
| 3,173,012 | 3/1965 | De Winter | 350/20 X |
| 3,244,885 | 4/1966 | McHenry | 250/203 |
| 3,398,285 | 8/1968 | Sachs | 250/203 X |
| 3,497,696 | 2/1970 | Amon et al. | 250/203 |

Primary Examiner—Roy Lake
Assistant Examiner—E. R. La Roche
Attorneys—C Cornell Remsen, Jr., Walter J. Baum, Paul W. Hemminger, Percy P. Lantzy and Thomas E. Kristofferson ABSTRACT: The disclosure relates to an optical system suitable for acquiring and tracking a distant source of light. The optical system contains an acquisition lens system having a first field of view formed of a plurality of centrally apertured lenses which are coaxially positioned to directly receive light rays from a source and lens means coaxially positioned behind the apertured lenses. The image surface of the acquisition lens system is coaxially positioned behind the lens means. Further, a tracking lens system having a second field of view is coaxially positioned with respect to the acquisition lens system and comprises a centrally apertured elliptical primary mirror positioned to directly receive light rays from said source. The mirror aperture is larger than the outer surface of said centrally apertured lenses. A spherical secondary mirror is positioned to receive light rays from said primary mirror and reflect the rays through said acquisition lens system aperture and through the lens means. The tracking lens system image surface is coincidental with the acquisition lens system image surface. Moreover, filter means are mounted within said acquisition lens aperture for reflecting a portion of the light source rays transmitted by the tracking lens system. The filter means may be in the form of a beamsplitter which transmits the reflected rays through the acquisition lens system onto a second image surface remote from said first image surface.

PATENTED OCT 19 1971
3,614,449
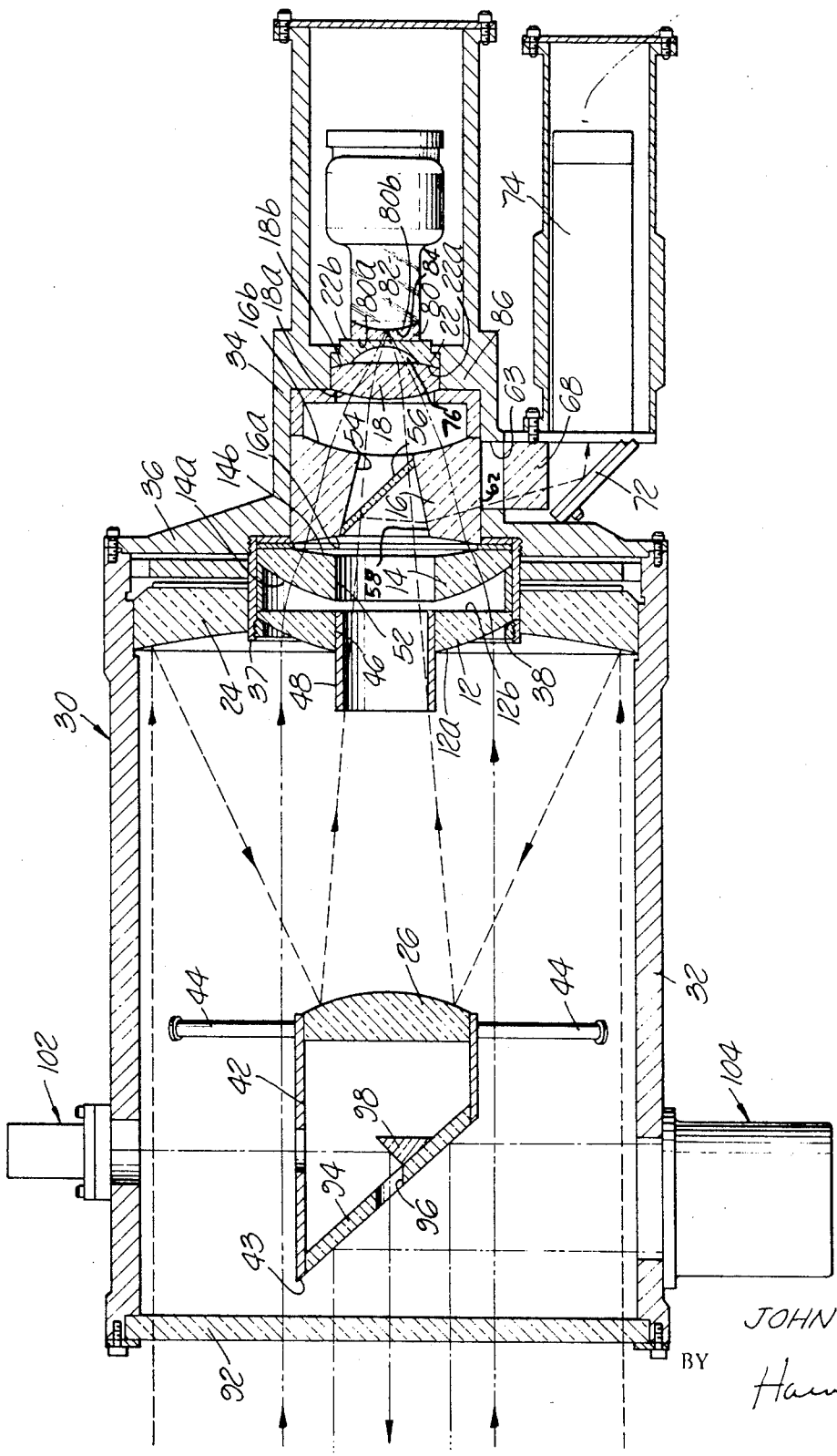
INVENTOR
JOHN H. WARD, III
BY Harvey S. Hertz
ATTORNEY 3,614,449

OPTICAL TRACKING SYSTEM UTILIZING A COAXIAL LENS SYSTEM

The invention described herein was made in the performance of work under a NASA contract and is subject to the provisions of Section 305 of the National Aeronautics and Space Act of 1958, Public Law 85-568 (72 state 435; 42 U.S.C. 2457).

OPTICAL TRACKING SYSTEM UTILIZING A COAXIAL LENS

The invention relates in general to dual field-tracking systems, and, more particularly, to an optical-tracking system utilizing a coaxial lens system.

BACKGROUND OF THE INVENTION

The utilization of optical-tracking systems in outer space must take into account severe environments such as wide temperature variations and radiation. Further, the system must necessarily be compact and light in weight. To design an optical-tracking system with these requirements in mind, and the high reliability required for space flight requires the use of optimum techniques.

In accordance with these requirements, the conventional acquisition and tracking system normally utilizes two separate lens systems; one for acquisition and one for tracking. While coaxial field optical systems have been previously utilized, the particular approaches thereto did not allow the system refinement which would produce a large ratio of acquisition to tracking field of view. Moreover, the optical system of the present invention provides a highly corrected image which is suitable for use with high resolution tracking sensors. Further, the reversed image field curvature is suitable with curved photocathode tracking tubes. Moreover, the system provides for a splitting off of wide band optical energy from the main narrow band-tracking beam for separate processing yet utilizes the prime optical system and elements which may be housed within the prime optical system, thus, further conserving space.

The advantages of this invention, both as to its construction and mode of operation will be readily appreciated as the same become better understood by reference to the following detailed description when considered in connection with the accompanying drawing.

BRIEF DESCRIPTION OF THE DRAWINGS

The figure depicts a view of a preferred embodiment of the optical system partly in cross section.

Referring now to FIG. 1, there is shown a dual field optical-tracking system having coaxial fields. THe optical system contains a coaxial lens system, one lens system having a wide field lens system of short focal length while the other lens system having a narrow field lens system of long focal length. The two coaxial lens systems have coincidental image surfaces. The two systems may be used, for example, for wide field acquisition and narrow field precision image tracking. In such an instance, the acquisition lenses are formed of lenses 12, 14, 16, 18 and 22. The tracking system is formed by an elliptical primary mirror 24, a spherical secondary mirror 26, and the lenses 18 and 22, which are also utilized in the acquisition tracking system. The optical system is housed in an aluminum housing 30 formed of an enlarged forward section 32, and a reduced diameter rear section 34. A forward facing shoulder 36 interconnects the two sections and has annular section 37 extending forwardly therefrom.

The primary mirror 24 contains a circular opening 38 and is secured at the opening to the outer surface of annular section 37. The secondary mirror 26 may be mounted in the housing portion 32 by means of a cylindrical sleeve 42 having an oblique truncated end 43, which surrounds the outer perimeter of the mirror and a plurality of aluminum arms 44 which connect the sleeve 42 to the inner surface of the housing portion 32.

The lens 12 may be secured along its outer perimeter, to the inner surface of the annular section 37. Secured within an opening 46 of the lens 12 is a light baffle 48 which extends forwardly from the front surface of the lens and may be made of aluminum or other light impervious material. THe light baffle 48 prevents spurious signals other than that emitted by the secondary mirror 26 from passing through the tracking portion of the system. The lens 12 is formed of a convex front surface 12a and a near planar rear surface 12b. The lens 14 is mounted behind the lens 12 and is formed of a convex front surface 14a, a concave rear surface 14b, and contains an opening 52 of the same size as the opening 46 of lens 12. The lens 16 has a concave front surface 16a and a concave rear surface 16b is mounted behind the lens 14 at the forward end of the rear section 34, and contains a truncated conical opening 54 which is enlarged at its forward end and reduced at its rear end. Mounted between the top of the forward end of the opening 54 and the bottom of the rear end of the opening, is an elliptical beam splitter 56 mounted at an angle to the axis of the optical system so as to compensate for the refraction at the conical surface opening 54.

The lower portion 58 of opening 54 in lens 16 and the lower outer surface 62 of lens 16 are polished and coated so that the light signals which are reflected by the beam splitter 56 through the lens 16 and an opening 63 in section 34 are dispersed through the lower portion of the lens 16. Mounted below the lower bottom surface 62 of the lens 16 is a planoconvex lens 68 which converges the rays reflected from the beam splitter 56 and which have been diverged by passing through the side of lens 16. These rays are then transmitted through the lens 68 to a 45° reflector 72 and hence to a detector 74. The lens 68 is needed to converge the rays passing through the side of lens 16 if the detector 74 is placed some distance from the lens 16.

The lens 18 which has a convex front surface 18a and a convex rear surface 18b, is secured at its outer rear perimeter to the concave front surface 22a of the lens 22, with an airgap 76 being formed between the central rear surface of lens 18 and the central front surface of lens 22. The planar rear surface 22b of the lens 22 is adjacent a faceplate 80 of a detecting tube 82 at its front surface 80a. The tube 80 contains a curved photocathode surface 84 which is adjacent the rear surface 80b of the faceplate. Both lenses 18 and 22 are mounted in a reduced diameter mounting flange 86 formed in the rear section 34.

The front end of the cylindrical member 30 has secured thereto, a protective glass plate 92. Mounted between the glass plate 92 and the secondary mirror 26, at the front end 43 of the cylinder 42, is a 45° reflector 94 having a central opening 96. Mounted on the rear surface of the reflector 94 is another 45° reflector 98 which reflects rays through the opening 96. Mounted on the top of the forward section of the housing 30 is a pulse source such as a laser, whose rays are reflected by the 45° reflector 98 and transmitted through the front glass plate 92. Mounted on the bottom of the front section of the housing 30 is a continuous wave (cw) source 104 which transmits a cw light signal to the 45° reflector 94 and, hence, out through the front plate 92.

The system as thus far described, may be utilized for active illumination acquisition and tracking where both range and range rate are needed. Pulses from the laser source 102, together with the cw signals from the source 104 are transmitted through the reflector 98 and 94, respectively. When a target has initially been detected, and reflected signals are received by the system in the acquisition mode, these signals are transmitted through the lenses 12, 14, 16, 18 and 22, where they impinge upon the surface 84 of the tube 82. The tube 82, or sensing element, may be used both as an angle tracker and a long range and range rate measuring circuit. The tube may be of the type manufactured by ITT Industrial Laboratories, Fort Wayne, Indiana, Model F-4004, Image Dissecting Multiplier Phototube. An electrostatic lens arrangement in the neck of the tube forms an electronic image of the photocathode on a dissecting aperture. The aperture, together with the optic focal length, determines the instantaneous field of view of the sensing element. By placing the two-axis deflection foil around the neck of the tube, the aperture projection can be deflected to any part of the photocathode, making it possible to have the acquisition and tracking fields of view that are much larger than the instantaneous field of view. Directly behind the dissecting aperture is a 15-stage electron multiplier.

When a target is acquired by means of the sensing element 82 and the lens system 12, 14, 16, 18 and 22 correctional signals normally would be produced by peripheral equipment (which form no part of the invention), so that the system is rotated to a position where the tracking mode can commence operation. In the tracking mode, signals from the laser source 102 project on the primary mirror 24 which are reflected onto the secondary mirror 26 and through the beamsplitter 56 and the lenses 18 and 22, where they impinge on the sensing element 82, as previously described. Signals reflected from the cw source, however, are reflected by the 45° reflector 94, transmitted to the target and then reflected back onto the elliptical primary mirror 24. The elliptical primary mirror reflects the cw signal to the spherical secondary mirror and hence to the beamsplitter 56. The beamsplitter, which acts as a band-pass filter, which passes the narrow frequency spectrum of the reflected laser source signals. However, the cw source contains a side band spectrum normally centered about the same frequency as the pulse laser source and a wide band outside of the narrow center frequency band is reflected by the beamsplitter 56 through the side of lens 16 where the rays are converged by means of lens 68 and reflected by the reflector 72, where they are detected by the detector 74. Thus, the cw source which may allow high data rates for fine ranging, may utilize the same coaxial lens system as the laser pulse rays which provide the course ranging data.

The acquisition and tracking lens systems superimpose their information on the photocathode surface, which is the image surface 84. However, due to the strength of the tracking signal as compared to that of the acquisition signals, the effect of the acquisition signal is minimal. As an example, the acquisition lens system consisting of lenses 12, 14, 16, 18 and 22 together with the image surface 84 was designed as an f-0.94 lens system having a 3.4-inch effective focal length, and is designed with its entrance pupil near the front surface of lens 12. This optical design is such as to keep the ray heights in lenses 12, 14 and 16 sufficiently above the optical axis to allow removal of the glass from the center portion of these lenses, for passage of the rays from the tracking system. The lenses 18 and 22 which are in both the acquisition and the tracking path produce the desirable effect of reducing the focal length of the tracking system as well as providing the proper image surface curvature. The tracking system depicted in the Figure is of the Dall-Kirkham type, consisting of the elliptical primary mirror 24 and the spherical secondary mirror 26 and includes, of course, the lenses 18 and 22. Alternatively, other types of narrow field reflective catadioptric systems could be used for tracking. However, the field is relatively narrow and the system selected is believed to be the least critical of misalignment and can be relatively easily fabricated.

As an example, the focal length, field of view, effective aperture, image surface radius and blur diameter for the dual field-tracking system is given in table I for a typical optical system. Further, lens data for the acquisition and tracking system is given in tables II and III, respectively.

TABLE I

|  | Acquisition System | Tracking System |
|---|---|---|
| Focal Length | 3.4 | 24.3-inch |
| Field of View | 10° | 0.75° |
| Effective Aperture | 2.57-inch diameter | 5.8-inch diameter |
| Image Surface Radius | 1.23-inch | 1.23-inch |
| f/Number | 0.94 | 4.2 |
| Blur Diameter | 0.005-inch | 0.002-inch |

TABLE II

Acquisition Lens Data

| Lens No. | Surface No. | Radius (inch) | Spacing (inch) | Thickness (inch) | Glass Type |
|---|---|---|---|---|---|
| 12 | 12a | 2.985 | | 0.800 | SK16 |
| | 12b | -135.4 | 0.000 | | Air |
| 14 | 14a | 3.030 | | 0.750 | SK16 |
| | 14b | 14.08 | 0.260 | | Air |
| 16 | 16a | -9.215 | | 1.215 | SF8 |
| | 16b | 3.075 | 0.770 | | Air |
| 18 | 18a | 1.613 | | 0.575 | SK16 |
| | 18b | -4.618 | 0.280 | | Air |
| 22 | 22a | -0.699 | | 0.010 | EK-450 |
| | 22b | ∞ | 0.0025 | | Air |
| Photo multiplier Faceplate 80 | 80a | ∞ | | 0.045 | 7056 |
| | 80b | 1.230 | | | |

TABLE III

Tracking Lens Data

| Lens No. | Surface No. | Radius (inches) | Distance between elements (inches) | Thickness (inches) | Glass Type |
|---|---|---|---|---|---|
| Primary Mirror 24 | Elliptical K=-6.06 Center Radius of -19.342 | | 6.350 | | Pyrex Air |
| Secondary Mirror 26 | -9.667 | | 9.685 | | Pyrex Air |
| 18 | 18a | 1.613 | | 0.575 | SK16 |
| | 18b | -4.618 | 0.280 | | Air |
| 22 | 22a | -0.699 | | 0.010 | EK450 |
| | 22b | ∞ | 0.0025 | | Air |
| Photo multiplier Faceplate 80 | 80a | ∞ | | 0.045 | 7056 |
| | 80b | 1.230 | | | |

While the invention has been described as active system, it is understood, of course, that the invention could also be used in a passive system.

I claim:

1. An optical system suitable for acquiring a distant source of light comprising:

an acquisition lens system having a first field of view formed of a plurality of lenses having central apertures and coaxially positioned to directly receive light rays from said source, and lens means coaxially positioned behind said centrally apertured lenses, said acquisition lens system having an image surface behind said lens means;

a tracking lens system having a second field of view coaxially positioned with respect to said acquisition lens system comprising a centrally apertured elliptical primary mirror, said mirror aperture having a diameter larger than the outer diameter of said centrally apertured acquisition lenses, said elliptical primary mirror being positioned to directly receive light rays from said source, and a spherical secondary mirror positioned to receive light rays from said elliptical primary mirror and reflect them through said acquisition lens central aperture and through said lens means, said tracking lens system image surface being coincidental with said acquisition lens system image surface; and filter means mounted in said acquisition means aperture for reflecting a portion of said light source rays transmitted by said tracking lens system onto a second image surface remote from said acquisition and tracking lens system image surface.

2. An optical system in accordance with claim 1 wherein said filter means comprises a beamsplitter, the beamsplitter transmitting said filtered rays through said acquisition lens system onto said second image surface.

3. An optical system in accordance with claim 2 wherein said beamsplitter acts as a band-pass filter.

4. An optical system in accordance with claim 1 wherein said coincidental image surface is curved.

5. An optical system in accordance with claim 1 wherein said coincidental image surface comprises a curved photocathode surface.

6. An optical system in accordance with claim 2 and further comprising a lens for converging said filtered rays transmitted through said acquisition lens system when said second image surface is remote from said acquisition lens system.